US012763540B2

(12) United States Patent
Jheng

(10) Patent No.: US 12,763,540 B2
(45) Date of Patent: Oct. 13, 2026

(54) PORTABLE WIRE STRIPPING AND CRIMPING MACHINE

(71) Applicant: Yuan Cheng Automatic Control CO., LTD., Taichung (TW)

(72) Inventor: Jhih-Sian Jheng, Taichung (TW)

(73) Assignee: Yuan Cheng Automatic Control CO., LTD., Taichung (TW)

(*) Notice: Subject to any disclaimer, the term of this patent is extended or adjusted under 35 U.S.C. 154(b) by 427 days.

(21) Appl. No.: 18/509,323

(22) Filed: Nov. 15, 2023

(65) Prior Publication Data

US 2025/0158340 A1 May 15, 2025

(51) Int. Cl.
*H01R 43/05* (2006.01)

(52) U.S. Cl.
CPC .................................... *H01R 43/05* (2013.01)

(58) Field of Classification Search
CPC ...................................................... H01R 43/05
See application file for complete search history.

(56) References Cited

U.S. PATENT DOCUMENTS 3,839,776 A * 10/1974 Anderson .............. H01R 43/05 29/862
3,867,754 A * 2/1975 Koch ..................... H01R 43/05 29/56.6
3,909,900 A * 10/1975 Gudmestad .......... H01R 43/052 29/863
3,919,758 A * 11/1975 Stepan ................... H01R 43/04 29/753
4,361,942 A * 12/1982 Mazzola .............. H01R 43/052 29/748
4,406,604 A * 9/1983 Imai ....................... H01R 43/28 425/129.1
4,715,099 A * 12/1987 Yoshida ................. H01R 43/05 29/564.6
4,720,912 A * 1/1988 Frohlich .............. H01R 43/055 29/565

(Continued)

FOREIGN PATENT DOCUMENTS

CN 217071052 U * 7/2022
DE 19615564 C1 * 7/1997 ............. H01R 43/05
WO WO-2011145200 A1 * 11/2011 ............. H01R 43/05

OTHER PUBLICATIONS

Machine translation of CN-217071052-U (Year: 2022).*
Machine translation of WO-2011145200-A1 (Year: 2011).*
Machine translation of DE-19615564-C1 (Year: 1997).*

*Primary Examiner* — Kyle A Cook

(57) ABSTRACT

A portable wire stripping and crimping machine, comprising: a base having a housing and an operation front. On the base, from left to right of the operation front, a feeding module, a wire stripping module, a crimping module, and an insulation stripping module are provided, respectively, the crimping module being connected to the feeding module and its bottom side being connected to the wire stripping module; and an operation control module having multiple switch buttons provided on a control side connected to the operation front. The crimping module consists of a first motor reducer, a toggle mechanism, and a crimping mechanism. The wire stripping module consists of a second motor reducer, a wire clamping mechanism, and a die cutter mechanism. The insulation stripping module consists of a third motor reducer and an insulation stripping mechanism.

10 Claims, 6 Drawing Sheets

(56) References Cited

U.S. PATENT DOCUMENTS

| | | | | | |
|---|---|---|---|---|---|
| 4,852,241 | A * | 8/1989 | Belaidouni | H01R 43/05 | |
| | | | | 29/818 | |
| 4,951,369 | A * | 8/1990 | Verrall | H01R 43/05 | |
| | | | | 83/947 | |
| 5,058,260 | A * | 10/1991 | Gloe | H01R 43/05 | |
| | | | | 72/418 | |
| 6,230,386 | B1 * | 5/2001 | Hasegawa | H01R 43/28 | |
| | | | | 29/33 M | |
| 2005/0087055 | A1 * | 4/2005 | Ruchti | H01R 43/05 | |
| | | | | 83/694 | |
| 2009/0205205 | A1 * | 8/2009 | Kamber | H01R 43/052 | |
| | | | | 29/863 | |
| 2010/0071203 | A1 * | 3/2010 | Blickenstorfer | H01R 43/048 | |
| | | | | 29/753 | |
| 2014/0157577 | A1 * | 6/2014 | Simmons | H01R 43/28 | |
| | | | | 29/445 | |
| 2016/0141821 | A1 * | 5/2016 | Conte | H01R 43/05 | |
| | | | | 29/742 | |
| 2019/0006809 | A1 * | 1/2019 | Takada | H01R 43/052 | |
| 2021/0181704 | A1 * | 6/2021 | Fröhlich | G05B 19/182 | |
| 2022/0200224 | A1 * | 6/2022 | Sorg | H01R 43/20 | |
| 2022/0239048 | A1 * | 7/2022 | Karrasch | H01R 43/048 | |
| 2022/0278492 | A1 * | 9/2022 | Orlowski | G06F 3/04847 | |
| 2024/0022034 | A1 * | 1/2024 | Karrasch | H01R 43/05 | |

* cited by examiner

PORTABLE WIRE STRIPPING AND CRIMPING MACHINE

FIELD OF INVENTION

The present invention relates to a compact and lightweight wire stripping and crimping machine that can be portable and powered solely by electricity.

BACKGROUND OF THE INVENTION

Conventional wire stripping and crimping machines on the market today tend to be large and heavy, typically weighing between 80 and 100 kilograms. These machines are typically limited to shop floor use and require a separate air compressor to operate. They rely on cylinders as a crimping force, which requires a connection to external power sources rather than being powered solely by electricity. Furthermore, existing wire stripping and crimping machines typically focus on stripping the inner insulation of wires and crimping terminals, without the ability to handle the outer insulation of the wires. In addition, adjustments to the number of crimped pins and machine settings are managed manually through an on-site human-machine interface, preventing remote monitoring and control. This lack of remote accessibility causes significant inconvenience and limits its usefulness. Hence, there is an urgent need to address these challenges by reducing the size and weight of wire stripping and crimping machine, enabling portability, and facilitating convenient remote monitoring and control. This would ultimately increase the efficiency and convenience of its use.

SUMMARY OF THE INVENTION

The present invention relates to a compact and lightweight wire stripping and crimping machine that can be portable and powered solely by electricity.

To accomplish the foregoing purposes, the present invention provides a portable wire stripping and crimping machine comprising: a base having a housing and an operation front. On the base, from left to right of the operation front, a feeding module, a wire stripping module, a crimping module, and an insulation stripping module are provided, respectively, the crimping module being connected to the feeding module and its bottom side being connected to the wire stripping module; further comprising an operation control module having multiple switch buttons provided on a control side connected to the operation front. Wherein, the crimping module is composed of a first motor reducer, a toggle mechanism, and a crimping mechanism, the first motor reducer driving both the toggle mechanism and the feeding module, and the toggle mechanism being connected to the crimping mechanism to enable the crimping mechanism to move up and down. Wherein, the wire stripping module includes a second motor reducer, a wire clamping mechanism, and a die cutter mechanism, the second motor reducer driving both the wire clamping mechanism and the die cutter mechanism. Wherein, the insulation stripping module includes a third motor reducer and an insulation stripping mechanism, the third motor reducer driving the insulation stripping mechanism. Wherein, the operation control module is electrically coupled to the first motor reducer, the second motor reducer, and the third motor reducer.

DETAILED DESCRIPTION OF THE PREFERRED EMBODIMENTS

Figure 1:
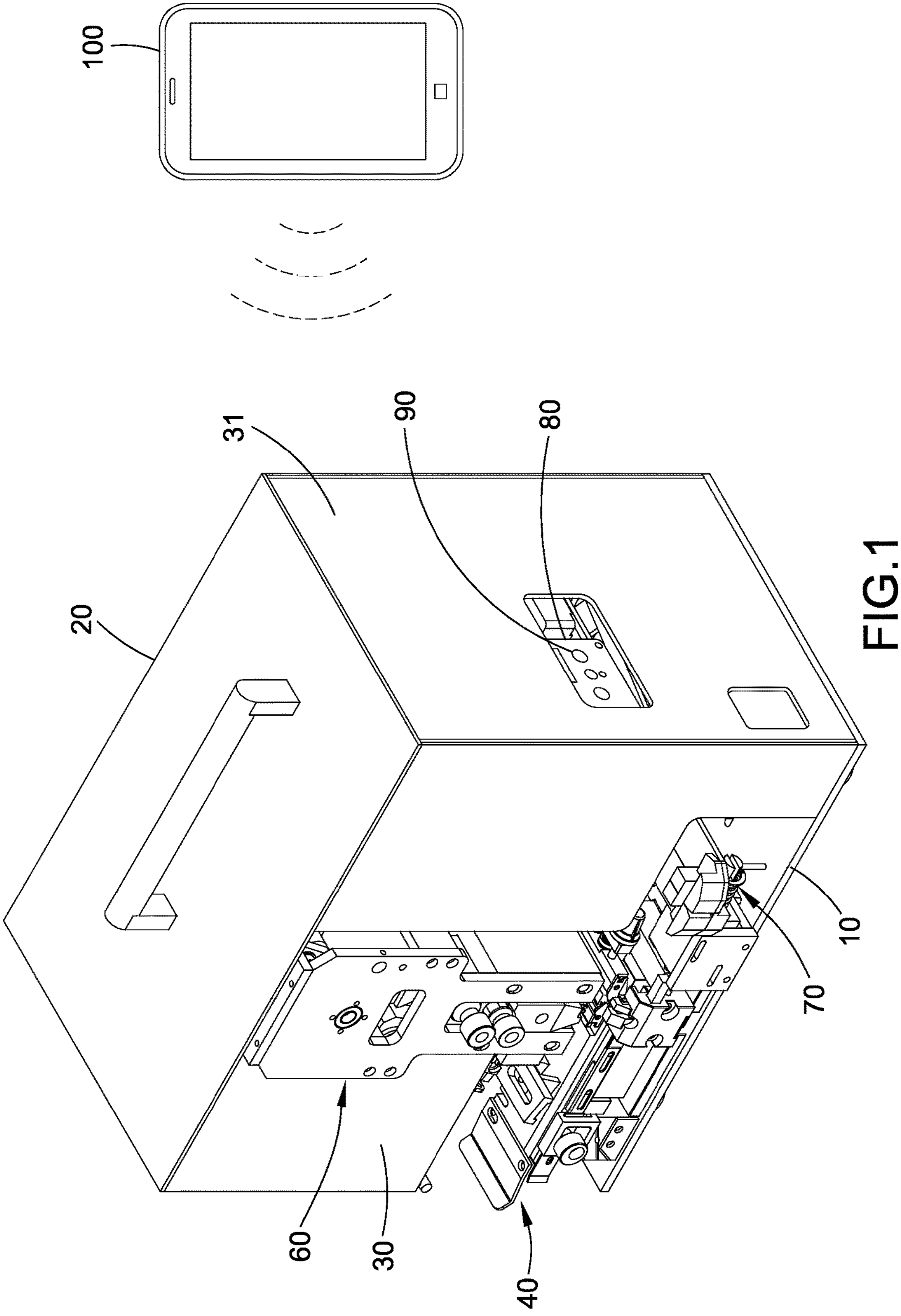
FIG. 1 is a schematic three-dimensional view of the present invention.
Figure 2:
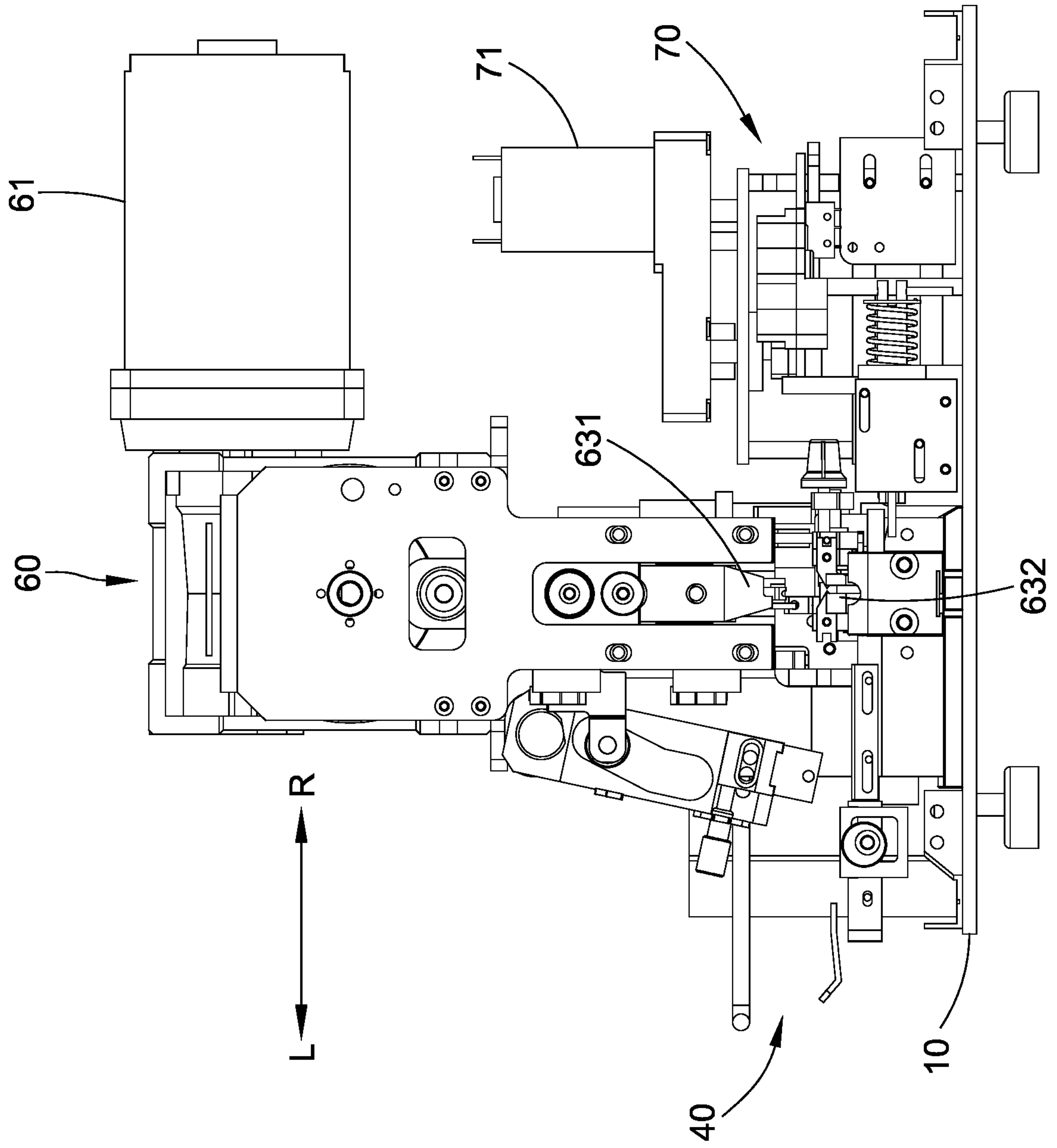
FIG. 2 is a schematic front view of the operation of the internal mechanism of the present invention.
Figure 3:
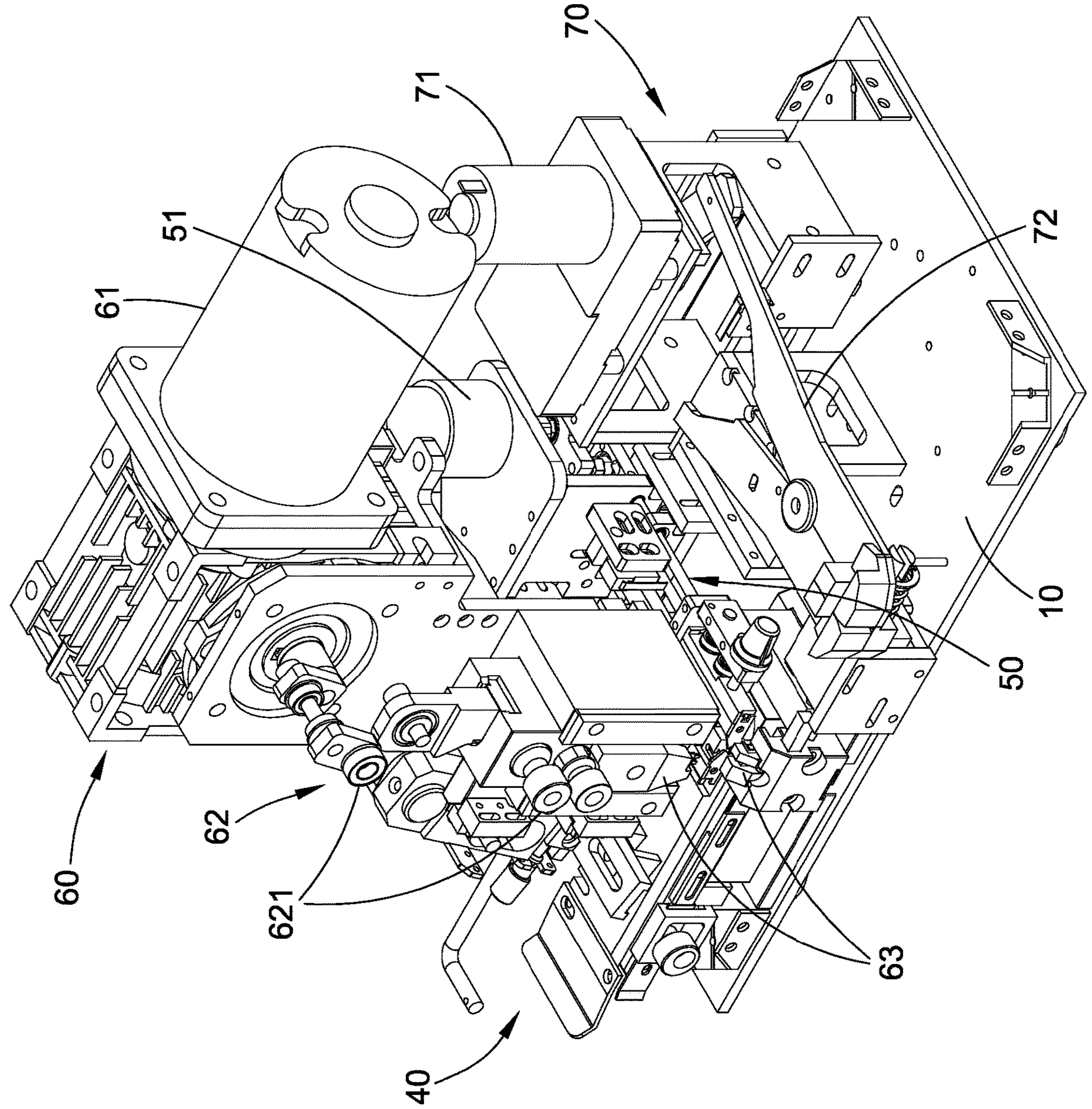
FIG. 3 is a schematic three-dimensional view of the internal mechanism of the present invention.
Figure 4:
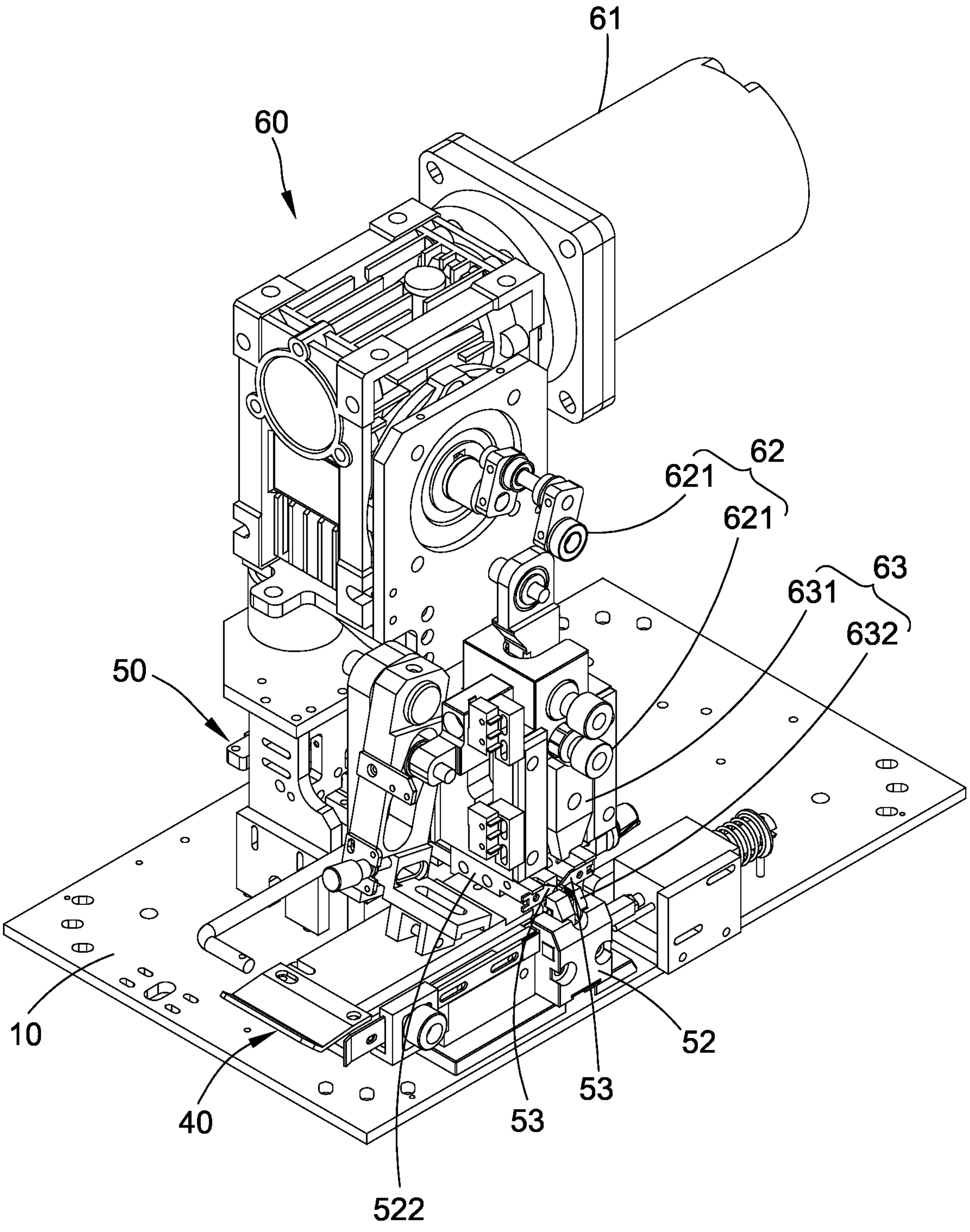
FIG. 4 is a schematic three-dimensional view of the crimping module and the feeding module of the present invention.
Figure 5:
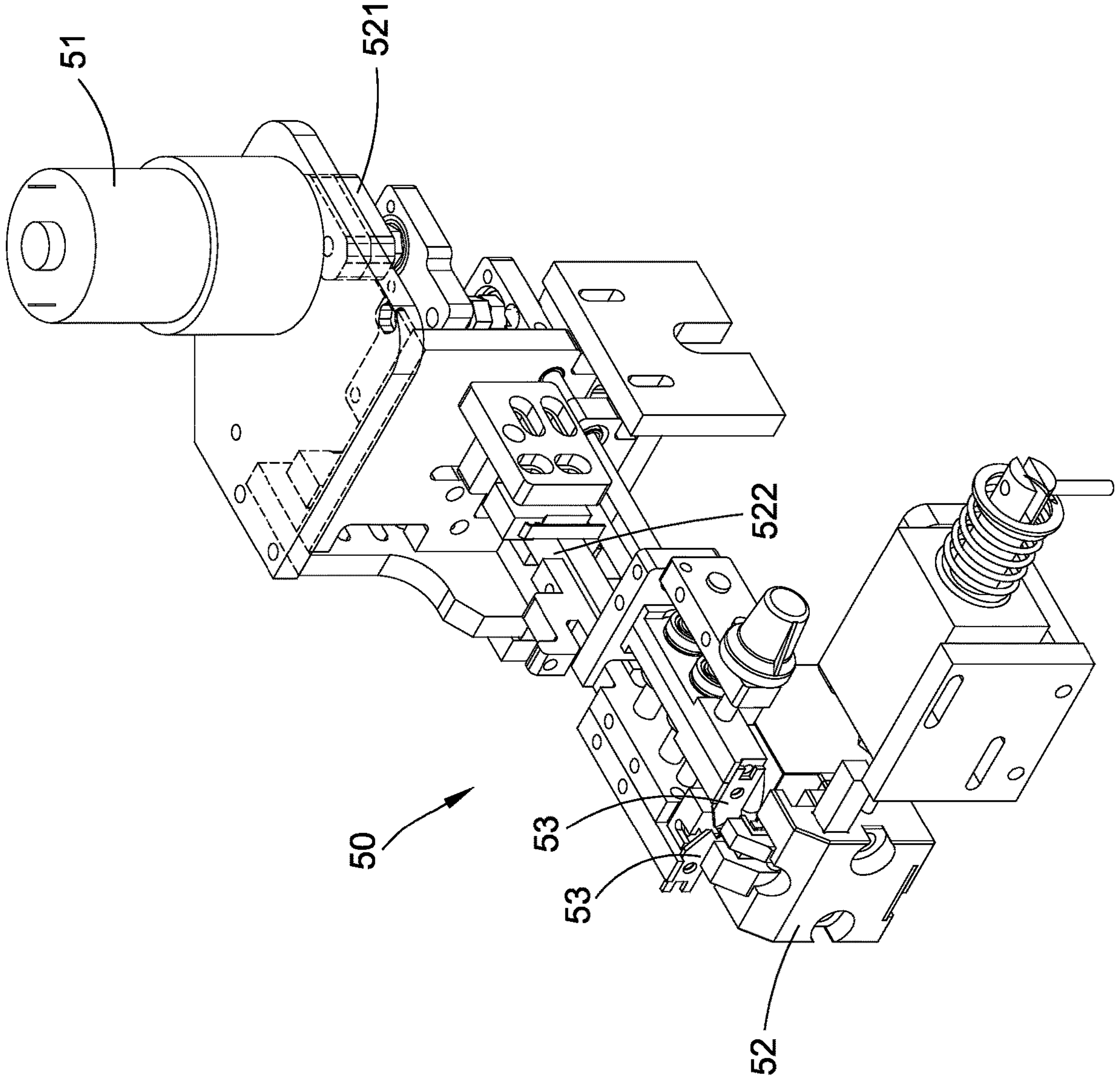
FIG. 5 is a schematic three-dimensional view of the wire stripping module of the present invention.
Figure 6:
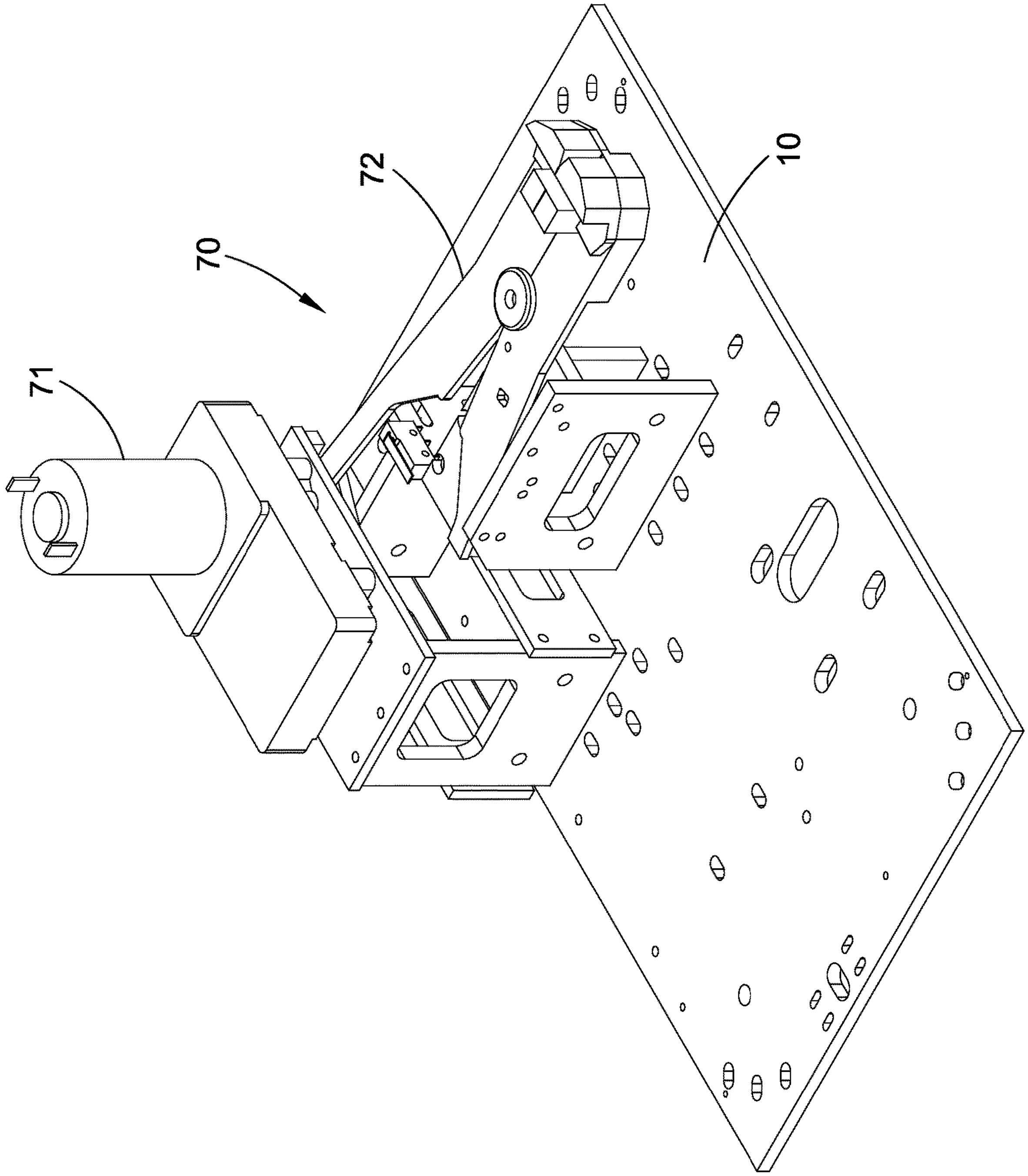
FIG. 6 is a schematic three-dimensional view of the insulation stripping module of the present invention.

Referring to FIGS. 1 to 6, the drawings show that the present invention provides a portable wire stripping and crimping machine comprising: a base 10 and an operation control module 80, the base 10 having a housing 20 and an operation front 30. On the base 10, from a left side L of the operation front to a right side R of the operation front, a feeding module 40, a wire stripping module 50, a crimping module 60, and an insulation stripping module 70 are provided, respectively.

The housing 20 is capped over the base 10 including all of the modules on the base 10, and the housing 20 may have a lifting handle on the top to facilitate lifting and carrying the whole portable wire stripping and crimping machine.

The operation control module 80 having multiple switch buttons is provided on a control side 31 connected to the operation front 30, and the housing 20 is provided with an opening at a corresponding position of the operation control module 80 to facilitate a user to press the switch buttons on the operation control module 80 for operation directly from outside the housing 20.

The crimping module 60 is composed of a first motor reducer 61, a toggle mechanism 62, and a crimping mechanism 63, wherein the first motor reducer 61 drives both the toggle mechanism 62 and the feeding module 40, and the toggle mechanism 62 is connected to the crimping mechanism 63 to enable the crimping mechanism 63 to move from up to down. The crimping mechanism 63 is provided with an upper mold 631 and a lower mold 632, wherein a bottom side of the lower mold 632 is connected to the wire stripping module 50.

The toggle mechanism 62 comprises multiple connecting levers 621 connected to each other, wherein one of the connecting levers 621 is connected to the upper mold 631, and these connecting levers 621 are driven by the first motor reducer 61, and wherein one of these connecting levers 621 moves the upper mold 631 both up and down. The toggle mechanism 62 constituted by the at least two connecting levers 621 generates a considerable force when the connecting levers 621 form a straight line during operation, and when an angle formed by the two connecting levers 621 is more than 120°, an input force of the first motor reducer 61 can generate an output force that exceeds the original magnitude. When the angle formed by the two connecting levers 621 reaches 150°, the output force can be up to 2 times the original input force. For example, when the first motor reducer 621 inputs a force of 5 kg, the toggle mechanism 62 formed by the connecting levers with the angle of 150° can output a force of up to 10 kg, which achieves the characteristic of increasing force, and even when the angle is 160°, the output force can be up to 3 times the original input force. In this way, by using the toggle mechanism 621, the output force can be doubled by using only the electricity to drive the first motor reducer 621, which can generate the force required to compress the terminal without the need to use a cylinder air compressor connected to the crimping mechanism 63, can not only reduce the installation of large-scale cylinder air compressor volume, but only need to connect to the solely external power supply to carry out the compression, and without the need to connect a gas storage tank, which makes the volume of the entire wire stripping and crimping machine can be greatly reduced, and the weight can be reduced to less than 15 kg, so it is convenient to carry it to various work sites for stripping and crimping, and with the advantages of power saving and efficiency.

The first motor reducer 621 drives the feeding module 40 to propel a terminal component unit from the left side L of the operation front to the right side R of the operation front to the position of the crimping mechanism 63. The upper mold 631 crimps the terminal component unit and a conductor of a wire from top to bottom so that the two are coupled between the upper mold 631 and the lower mold 632.

The wire stripping module 50 includes a second motor reducer 51, a wire clamping mechanism 52, and a die cutter mechanism 53, wherein the second motor reducer 51 drives both the wire clamping mechanism 52 and the die cutter mechanism 53. The wire clamping mechanism 52 includes a crank 521 and a linear guide mechanism 522, wherein the second motor reducer 51 drives the crank 521 which is linked to the linear guide mechanism 522 for a forward and backward movement, and the tail end of the linear guide mechanism 522 is connected to the die cutter mechanism 53. The second motor reducer 51 drives the clamping mechanism 52 to clamp the wire and drives the die cutter mechanism 53 to cut an inner insulation of the wire, then the second motor reducer 51 drives the linear guide mechanism 522 to move backward to pull apart the inner insulation of the wire.

The insulation stripping module 70 includes a third motor reducer 71 and an insulation stripping mechanism 72 driven by the third motor reducer 71. In this embodiment, the insulation stripping mechanism 72 is a wire stripping plier which is driven by the third motor reducer 71 to open and close and which cuts an outer insulation of the wire. In other embodiments, the insulation stripping mechanism 72 may also be a rotary insulation stripping machine.

The operation control module 80 is electrically connected to the first motor reducer 61, the second motor reducer 51, and the third motor reducer 71 while being connected to a wireless transmission system 90.

When a user is at the operation front 30 of the portable wire stripping and crimping machine of the present invention, the operation mode can be turned on or off by pressing a button on the operation control module 80 from a control side 31 connected to the operation front 30.

When the external power supply is connected to the portable wire stripping and crimping machine, the power input to each motor reducer of the machine can be activated by simply pressing the On button.

The user may first go to the insulation stripping module 70 on the far right side of the operation front 30 to strip the outer insulation of the wire with the insulation stripping mechanism 72, which in this embodiment is the wire stripping plier, and in other embodiments, the insulation stripping mechanism 72 may be the rotary insulation stripping machine.

After stripping the outer insulation of the wire, the user then inserts the wire into the crimping mechanism 63 of the crimping module 60 from the operation front 30, i.e., between the upper mold 631 and the lower mold 632, and at this time, the second motor reducer 51 drives the wire clamping mechanism 52 to clamp the wire and drives the die cutter mechanism 53 to cut the inner insulation of the wire, and immediately thereafter, the second motor reducer 51 drives the linear guide mechanism 522 to move backward to pull apart the inner insulation of the wire to complete the step of stripping the inner insulation of the wire.

Immediately after the first motor reducer 61 drives the feeding module 40 to advance the terminal component unit from the left side to the right side of the operation front 30 to the position of the crimping mechanism 63, and when the terminal component unit is advanced to the above of the wire, the first motor reducer 61 drives the toggle mechanism 62 to enable the toggle mechanism 62 to drive the upper mold 631 of the crimping mechanism 63 to apply a force from the top to the bottom. Since the toggle mechanism 62 is constituted by the connecting levers 621, when the force is inputted by the first motor reducer 61 through the connecting levers 521, which generates the doubling of its applied force and makes the output force sufficient to apply the compression, and the upper mold 631 of the crimping mechanism 63 can thus use this output force to crimp the terminal component unit onto the conductor of the wire. Therefore, the user can strip and crimp the wire in a single operation on the portable wire stripping and crimping machine of the present invention, and then crimp the terminal component unit onto the conductor of the wire after stripping the outer and inner insulations of the wire, so that the terminal component unit can be integrated with the conductor of the wire to become a terminal wire.

The portable wire stripping and crimping machine provided by the present invention uses only electricity as the source of crimping force, and does not need to be connected to the large external air compressor, so that the volume and weight of the entire machine can be reduced, and the machine can be portable, so that the use becomes more diversified, and by connecting the operation control module 80 to the wireless transmission system 90, so that an external mobile phone device 100 can be connected to the machine, and using the APP on the mobile phone device 100 to perform a switching operation, or to enable the external administrator to understand the situation at the site where the user is stripping and crimping, and also can adjust the machine by using the APP of the mobile phone device 100, which can enhance the adjustment to become more precise and better control the wire crimping position of the specifications and the intervals.

What is claimed is:

1. A portable wire stripping and crimping machine, comprising:

a base having a housing and an operation front, on the base, from left to right of the operation front, a feeding module, a wire stripping module, a crimping module, and an insulation stripping module are provided, respectively, the crimping module being connected to the feeding module and a bottom side of the crimping module being connected to the wire stripping module; and an operation control module having multiple switch buttons provided on a control side connected to the operation front;

wherein, the crimping module is composed of a first motor reducer, a toggle mechanism, and a crimping mechanism, the first motor reducer driving both the toggle mechanism and the feeding module, and the toggle mechanism being connected to the crimping mechanism to enable the crimping mechanism to move up and down;

wherein, the wire stripping module includes a second motor reducer, a wire clamping mechanism, and a die cutter mechanism, the second motor reducer driving both the wire clamping mechanism and the die cutter mechanism;

wherein, the insulation stripping module includes a third motor reducer and an insulation stripping mechanism, the third motor reducer driving the insulation stripping mechanism;

wherein, the operation control module is electrically coupled to the first motor reducer, the second motor reducer, and the third motor reducer.

2. The machine according to claim 1, wherein the wire clamping mechanism includes a crank and a linear guide mechanism, and wherein the second motor reducer drives the crank which is linked to the linear guide mechanism for a forward and backward movement, and the tail end of the linear guide mechanism is connected to the die cutter mechanism.

3. The machine according to claim 1, wherein the insulation stripping mechanism is a rotary insulation stripping machine.

4. The machine according to claim 1, wherein the operation control module is connected to a wireless transmission system.

5. The machine according to claim 1, wherein the crimping mechanism is provided with an upper mold and a lower mold, wherein a bottom side of the lower mold is connected to the wire stripping module.

6. The machine according to claim 5, wherein the toggle mechanism comprises multiple connecting levers connected to each other, wherein one of the connecting levers is connected to the upper mold, and these connecting levers are driven by the first motor reducer, and wherein one of these connecting levers moves the upper mold both up and down.

7. The machine according to claim 6, wherein the upper mold crimps a terminal component unit from top to bottom to couple with a conductor of a wire between the upper mold and the lower mold.

8. The machine according to claim 1, wherein the first motor reducer drives the feeding module to propel a terminal component unit from the left side of the operation front to the right side of the operation front to the position of the crimping mechanism.

9. The machine according to claim 8, wherein the insulation stripping mechanism is a wire stripping plier which is driven by the third motor reducer to open and close and which cuts an outer insulation of a wire.

10. The machine according to claim 9, wherein the second motor reducer drives the clamping mechanism to clamp the wire and drives the die cutter mechanism to cut an inner insulation of the wire, then the second motor reducer drives the linear guide mechanism to move backward to pull apart the inner insulation of the wire.

* * * * *